US011862827B2

(12) United States Patent
Pryor (10) Patent No.: US 11,862,827 B2
(45) Date of Patent: Jan. 2, 2024

(54) SYSTEM AND METHOD OF ENHANCED PURGE STRATEGY FOR FUEL CELL IN VEHICLE (71) Applicant: FORD GLOBAL TECHNOLOGIES, LLC, Dearborn, MI (US)

(72) Inventor: Martin Pryor, Canton, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 0 days.

(21) Appl. No.: 17/669,932

(22) Filed: Feb. 11, 2022

(65) Prior Publication Data
US 2023/0261227 A1 Aug. 17, 2023

(51) Int. Cl.
H01M 8/04828 (2016.01)
H01M 8/04313 (2016.01)
B60L 50/72 (2019.01)
H01M 8/04746 (2016.01)

(52) U.S. Cl.
CPC ......... H01M 8/04843 (2013.01); B60L 50/72 (2019.02); H01M 8/04313 (2013.01); H01M 8/04753 (2013.01); H01M 2250/20 (2013.01)

(58) Field of Classification Search
CPC ...................................... B60L 50/72
See application file for complete search history.

(56) References Cited

U.S. PATENT DOCUMENTS

2007/0207362 A1 9/2007 Koenekamp et al.
2011/0053026 A1* 3/2011 Ogawa .............. H01M 8/04231 429/440
2019/0016233 A1 1/2019 Jeon et al.

FOREIGN PATENT DOCUMENTS

CN 209691856 U 11/2019
KR 1020130064298 A * 6/2013 .............. H01M 8/04

OTHER PUBLICATIONS

Young et al., KR 1020130064298A; Espacenet machine translation, 2013 (Year: 2013).*

* cited by examiner

Primary Examiner — Adam A Arciero
(74) Attorney, Agent, or Firm — David B Kelley; Brooks Kushman P.C.

(57) ABSTRACT

A vehicle includes a fuel-cell system having a fuel cell, a purge valve, and a drain line extending from the purge valve. A controller is programmed to open the purge valve according to a baseline purge routine when the drain line slopes away from the purge valve, and open the purge valve according to an enhanced purge routine when the drain line slopes towards the purge valve.

17 Claims, 4 Drawing Sheets

SYSTEM AND METHOD OF ENHANCED PURGE STRATEGY FOR FUEL CELL IN VEHICLE

TECHNICAL FIELD

This disclosure relates to vehicles having a fuel cell power plant and more specifically purging and freeze protecting the fuel cell based on road grade.

BACKGROUND

The hydrogen fuel cell, and in particular the proton exchange membrane fuel cell (PEMFC), is one potential power source for automobiles and stationary applications. The reaction in a PEMFC involves hydrogen molecules splitting into hydrogen ions and electrons at the anode, while protons re-combine with oxygen and electrons to form water and release heat at the cathode. Typically, a proton exchange membrane is used as a proton conductor in a PEMFC. A catalyst layer containing, for example, platinum and/or a platinum alloy is used to catalyze the electrode reactions. A gas diffusion layer, which may include a microporous layer and a gas diffusion backing layer, is used to transport reactant gases and electrons as well as remove product water and heat.

SUMMARY

According to one embodiment, a vehicle includes a fuel-cell system having a fuel cell, a hydrogen supply, and a purge valve. A vehicle controller is programmed to: responsive to a pitch of the vehicle being within a threshold, control the hydrogen supply and the purge valve according to a baseline purge routine; and responsive to the pitch of the vehicle being outside of the threshold, control the hydrogen supply and the purge valve according to an enhanced purge routine.

According to another embodiment, a vehicle includes a fuel-cell system having a fuel cell, a hydrogen source, a hydrogen ejector, and a purge valve. A controller of the vehicle is programmed to, responsive to a purge request and a pitch of the vehicle being less than a threshold, (i) open the hydrogen ejector and (ii) open the purge valve for a first duration of time. The controller is further programmed to, responsive to the purge request and the pitch of the vehicle exceeding the threshold, (i) open the hydrogen ejector and (ii) open the purge valve for a second duration of time that is longer than the first duration of time.

According to yet another embodiment, a vehicle includes a fuel-cell system having a fuel cell, a purge valve, and a drain line extending from the purge valve. A controller is programmed to open the purge valve according to a baseline purge routine when the drain line slopes away from the purge valve, and open the purge valve according to an enhanced purge routine when the drain line slopes towards the purge valve.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

PEMFC are a popular fuel cell choice for automotive vehicles. The PEMFC generally includes a proton exchange membrane (PEM). The anode and the cathode typically include finely divided catalytic particles, usually platinum, supported on carbon particles and mixed with an ionomer. The catalytic mixture is deposited on opposing sides of the membrane. The combination of the anode-catalytic mixture, the cathode-catalytic mixture, and the PEM form a coated catalyst membrane electrode (CCM). In order to facilitate the transport of reactant gases to and remove the excessive water and heat from the catalytic mixture, a gas diffusion layer (GDL), which may include a microporous layer and a carbon-fiber-based gas diffusion backing layer, may be applied on either side of the CCM to form a membrane electrode assembly (MEA). GDLs also provide mechanical support for the soft goods including the PEM and catalytic mixtures.

MEAs are sandwiched between bipolar plates to form unit cells. The bipolar plates typically include an anode side and a cathode side. Anode fuel flow channels are provided on the anode side of the bipolar plates that allow the anode gas to flow to the anode side of the MEA. Cathode oxidant flow channels are provided on the cathode side of the bipolar plates that allow the cathode gas to flow to the cathode side of the MEA. Coolant channels may be disposed between the anode and cathode sides of the bipolar plates to thermally regulate the fuel cell.

Several unit cells are typically combined in a fuel-cell stack to generate the desired power. For example, the stack may include two-hundred or more unit cells arranged in series. The fuel-cell stack receives a cathode reacting gas, typically a flow of air forced through the stack by a compressor. Not all the oxygen is consumed by the stack and some of the air is output as a cathode exhaust gas that may include water as a stack byproduct. The fuel-cell stack also receives an anode hydrogen reacting gas that flows into the anode side of the stack.

Figure 1:
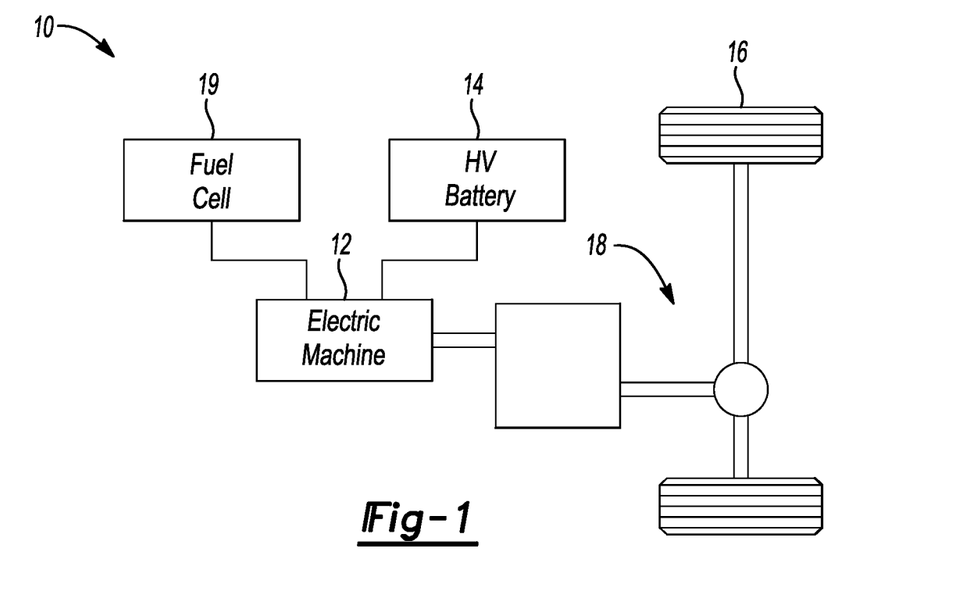
FIG. 1 is a schematic of a fuel cell vehicle.

Referring to FIG. 1, a vehicle 10 includes a fuel-cell system 19 for providing electrical power to at least one electric machine 12. The vehicle 10 may also include a traction battery 14 electrically connected to the fuel-cell system 19 and the electric machine 12. The electric machine 12 is connected to the driven wheels 16 via a drivetrain 18. During operation of the vehicle 10, hydrogen fuel and air are fed into a fuel cell of the system 19 creating electrical power. The electric machine 12 receives the electrical power as an input, and outputs torque for driving the wheels 16 to propel the vehicle 10.

The vehicle 10 also includes at least one controller 21 that controls one or more systems of the vehicle, such as those systems shown in FIG. 1. While illustrated as one controller, the controller 21 may be part of a larger control system and may be controlled by various other controllers throughout the vehicle 10, such as a vehicle system controller (VSC). It should therefore be understood that the controller 21 and one or more other controllers can collectively be referred to as a "controller" that controls various actuators in response to signals from various sensors to control functions such as controlling the fuel-cell system. Controller 21 may include a microprocessor or central processing unit (CPU) in communication with various types of computer-readable storage devices or media. Computer-readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the vehicle.

The controller communicates with various vehicle sensors and actuators via an input/output (I/O) interface that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU. Although not explicitly illustrated, those of ordinary skill in the art will recognize various functions or components that may be controlled by controller 21 within each of the subsystems identified above. Representative examples of parameters, systems, and/or components that may be directly or indirectly actuated using control logic executed by the controller.

The vehicle 10 includes an accelerometer or acceleration sensor 23 configured to output data to the controller 21. The accelerometer 23 may be configured to measure a plurality of different accelerations. For example, the accelerometer 23 may be configured to measure vehicle pitch and output pitch data to the controller 21. See FIG. 4 and related text for further details.

Figure 2:
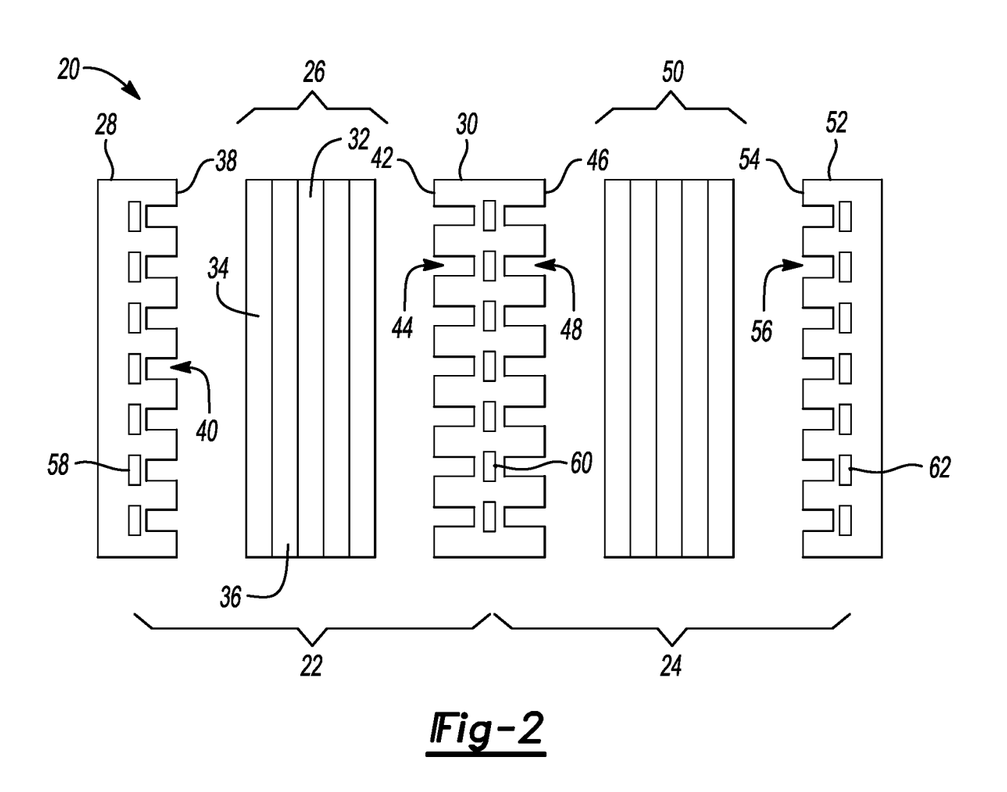
FIG. 2 is an exploded view of a proton exchange membrane fuel-cell stack.

Referring to FIG. 2, an example fuel cell 20 of the system 19 includes two unit cells 22, 24 stacked together. The two-cell stack is merely an example and the fuel cell 20 may include dozens or hundreds of stacked unit cells. The first unit cell 22 includes an MEA 26 sandwiched between a first end plate 28 and a bipolar plate 30. The MEA 26 is comprised of a plurality of different layers including a PEM 32, a pair of gas diffusion layers (GDL) 34 and a pair of catalyst layers 36. The endplate 28 includes an anode side 38 defining a plurality of flow paths 40 for the hydrogen fuel. The bipolar plate 30 includes a cathode side 42 defining a plurality of flow paths 44 for air and an anode side 46 defining a plurality of flow paths 48 for hydrogen fuel for the second unit cell 24. A second MEA 50 is sandwiched between the bipolar plate 30 and a last endplate 52. The last endplate 52 includes a cathode side 54 defining a plurality of flow paths 56 for air. The coolant channels 58, 62 are configured to circulate coolant, such as ethylene glycol.

Figure 3:
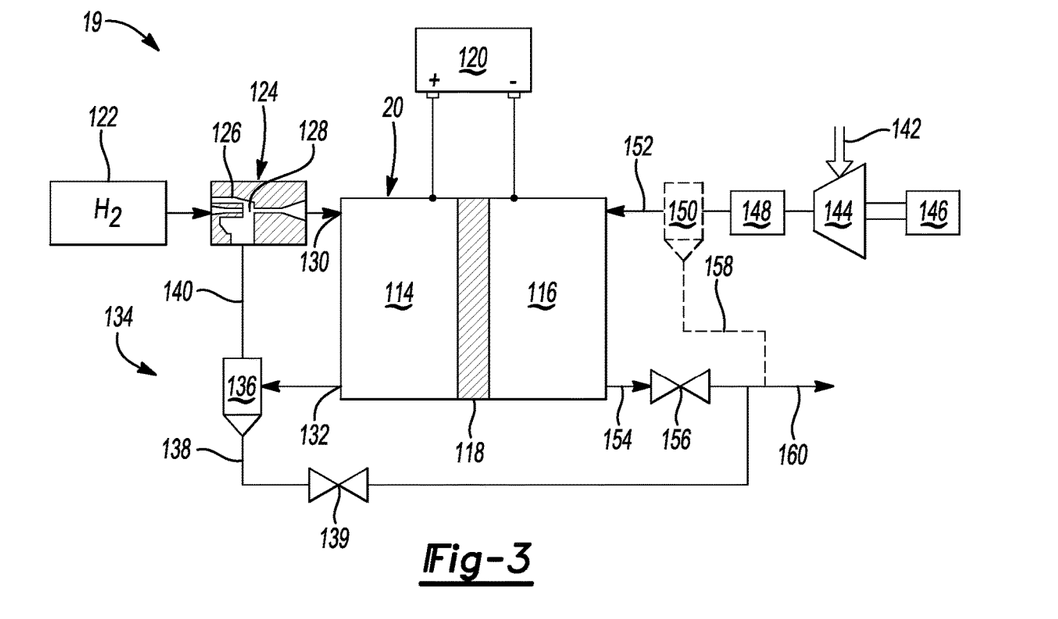
FIG. 3 is a schematic diagram of a fuel-cell system.

Referring to FIG. 3, the fuel-cell system 19 includes the fuel cell or fuel-cell stack 20. The stack 20 contains an anode side 114, a cathode side 116, and a membrane 118 therebetween. The fuel-cell system 20 electrically communicates with and provides energy, for example, to a high voltage bus 120 or a traction battery. The fuel-cell stack 20 may also have a cooling loop (not shown).

During operation of the fuel-cell system 19, product water, residual fuel such as hydrogen, and byproducts such as nitrogen, may accumulate at the anode side 114 of the fuel-cell stack 20. Attempts have been made to remove the liquid product water and byproducts and to reuse the residual hydrogen and water vapor. One approach is to collect those constituents in a separator 136 downstream of the fuel-cell stack 112, separate at least a portion of the liquid water and/or nitrogen, and return the remaining constituents to the fuel-cell stack 20 via a return passageway in a recirculation loop.

A primary fuel source 122 is connected to the anode side 114 of the fuel-cell stack 112, such as a primary hydrogen source. Non-limiting examples of the primary hydrogen source 122 are a high-pressure hydrogen storage tank or a hydride storage device. The hydrogen source 122 is connected to one or more ejectors 124 that control the flow of hydrogen to the stack. The ejector 124 may be or include a valve configured to control the flow of hydrogen. The ejector 124 has a nozzle 126 supplying hydrogen into the converging section of a converging-diverging nozzle 128. The diverging section of the nozzle 128 is connected to the input 130 of the anode side 114. This may be collectively referred to as a hydrogen supply.

The output 132 of the anode side 114 is connected to a passive recirculation loop 134. Typically, an excess of hydrogen gas is provided to the anode side 114 to ensure that there is sufficient hydrogen available to all of the cells in the stack 20. In other words, hydrogen is provided to the fuel-cell stack 20 above a stoichiometric ratio of one, i.e., at a fuel rich ratio relative to exact electrochemical needs. The recirculation loop 134 is provided such that excess hydrogen unused by the anode side 114 is returned to the input 130 so may be used and not wasted.

Additionally, accumulated liquid and vapor phase water is an output of the anode side 114. The anode side 114 requires humidification for efficient chemical conversion and to extend membrane life. The recirculation loop 134 may be used to provide water to humidify the hydrogen gas before the input 130 of the anode side 114.

The recirculation loop 134 contains a hydrogen-water separator 136, or water knock-out device. The separator 136 receives a stream or fluid mixture of hydrogen gas, nitrogen gas, and water from the output 132 of the anode side 114. The water may be mixed phase and contain both liquid and vapor phase water. The separator 136 removes at least a portion of the liquid phase water, which exits the separator through drain line 138. At least a portion of the nitrogen gas, hydrogen gas, and vapor phase water may also exit the drain line 138, and pass through a purge valve 139, for example, during a purge process of the fuel-cell stack 112. The remainder of the fluid in the separator 136 exits through passageway 140 in the recirculation loop 134, which is connected to the ejector 124. The fluid in passageway 140 is fed into the converging section of the converging-diverging nozzle 128 where it mixes with incoming hydrogen from the nozzle 126 and hydrogen source 122.

Liquid water may be removed from the anode side 114 by the separator 136 to prevent water blockages within the channels and cells of the anode side 114. Water blockages within the fuel-cell stack 20 may lead to decreases in cell voltage and/or voltage instabilities within the fuel-cell stack Liquid water may also be removed by the separator 136 to prevent a blockage or partial blockage within the ejector 124. A liquid water droplet in the diverging section of the converging-diverging nozzle 128 would effectively create a second venturi section within the nozzle 128 and lead to pumping instabilities for the ejector 124.

The cathode side 116 of the stack 112 receives oxygen, for example, as a constituent in an air source 142. In one embodiment, a compressor 144 is driven by a motor 146 to pressurize the incoming oxygen. The pressurized air is then humidified by a humidifier 148 before entering the cathode side 116. Another separator 150 (shown in phantom) may be positioned downstream of the humidifier 148. The separator 150 may be used to remove liquid water from the humidified air flow before it enters the cathode side 116 of the stack 112 at input 152. Water droplets may be present downstream of the humidifier 148 due to liquid water being entrained by air high flow rates within the humidifier 148. Liquid water may be removed by the separator 150 to prevent water blockages within the cells of the cathode side 116, leading to decreases in cell voltage and/or instabilities within the fuel-cell stack 112. The output 154 of the cathode side 116 is connected to a valve 156. Drain line 138 from separator 136, and a drain line 158 from separator 150 may be connected to an exhaust system 160 downstream of the valve 156. In other embodiments, the drain lines may be plumbed to other locations in the fuel-cell system 19.

Other system architectures may also be used for the fuel-cell system 19. For example, a turbine may be used in addition to the compressor 144 to induce flow through the cathode side 116. In one example, a turbine is positioned downstream of the cathode stack outlet 154, with a separator interposed between the cathode side 116 and the turbine to remove liquid water before the fluid stream enters the turbine.

Based on the use of the ejector 124 to create flow through the anode side 114 and induce flow through the passive recirculation loop 134, the ejector 124 must overcome any pressure drops in the system, which includes a typically significant pressure drop across the fuel-cell stack 20. The system 19 as shown does not include a pump or other device to induce flow in the recirculation loop 134, therefore all the compression work must be accomplished by the ejector, otherwise described as a jet pump. To enable this function, the separator 136 needs to have a low pressure drop across it. The separator 136 also needs to remove larger droplets of water from the fluid to prevent water blockages in the recirculating flow in the fuel-cell stack 20 or ejector 124 caused by droplets. The separator 136 permits vapor phase water and smaller water droplets to remain in the recirculating flow in passageway 140 and return to the ejector 124 for humidification purposes. In one example, the separator 136 removes water droplets having a diameter on the order of one millimeter or larger.

Additionally, as separator 136 receives fluid flow from the anode side 114, the separator 136 needs to be designed for use with hydrogen gas. Generally, hydrogen gas may cause material degradation or embrittlement issues and material used in the separator 136 need to be hydrogen compatible. Additionally, hydrogen is a small molecule, and many conventional separator devices are not suitable for use with hydrogen because their design may permit leaks, for example, with a conventional threaded connection. Other conventional separators may contain rotating or moving parts, such as a rotating vane, or the like, which may not be compatible with hydrogen as the lubricant may poison the fuel-cell stack 20, or the hydrogen may degrade or decompose the lubricant.

Separator 150 also needs to remove larger droplets of water from the fluid to prevent water blockages caused by droplets in the flow in the cathode side 116 of the fuel-cell stack 112. The separator 150 permits vapor phase water, and smaller water droplets to remain in the flow for humidification. In one embodiment, the separator 150 removes water droplets that are the same size or larger than the cathode side 116 flow field channel widths. In one example, the cathode side flow field channels are 0.2-1.0 millimeters.

Figure 4:
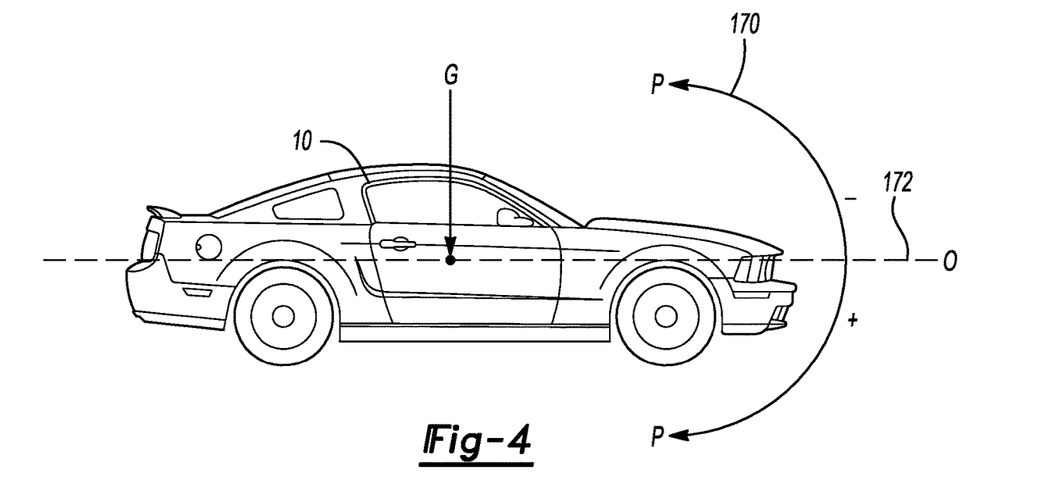
FIG. 4 is a diagrammatical view showing vehicle pitch.

FIG. 4 illustrates a schematic diagram of vehicle pitch 170 or tilt. Pitch is the rotation of the vehicle 10 about the traverse axis, i.e., the angle of the vehicle relative to the horizon 172. When the vehicle is on flat ground, the pitch is zero. When the vehicle is on a hill, the vehicle is pitched. The pitch may be expressed or quantified in a variety of different ways. In one embodiment, pitch is expressed as an angle relative to the horizon 172 or alternatively as a percentage. Here, the pitch angle may be expressed in degrees or radians. To quantify the direction of the pitch, e.g., uphill (nose up) or downhill (nose down), a sign convention may be used. In the illustrated example, upward pitch (when the vehicle is facing uphill) has a positive sign and downward pitch (when the vehicles facing downhill) has a negative sign.

The acceleration sensor 23 is configured to measure one or more accelerations and output data indicative of vehicle pitch 170. The controller is programmed to receive the pitch data from the accelerometer 23 and determine the pitch 170 of the vehicle. The pitch of the vehicle may be used as an input for one or more routines or protocols associated with operating the fuel-cell system 19.

Figure 5A:
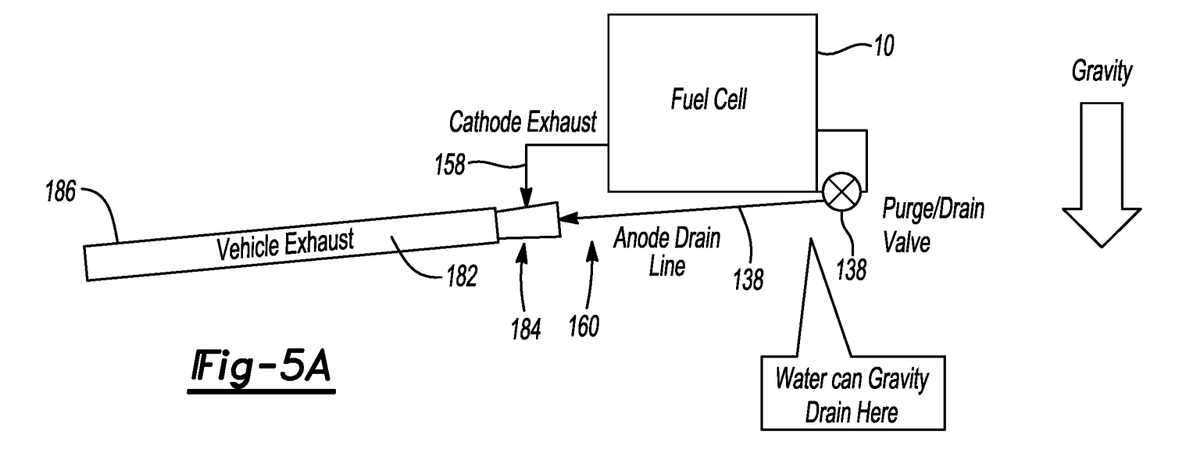
FIG. 5A illustrates the vehicle on a flat road grade in which purged contents of the fuel-cell system gravity feed through the vehicle exhaust.

Referring to FIG. 5A, the vehicle 10 includes an exhaust system 160 is in fluid communication with the anode side and the cathode side of the fuel-cell 112. The exhaust system 160 receives the cathode exhaust, the product water, hydrogen, and any other contents exiting the fuel-cell 112. The exhaust system 160 may include an exhaust pipe 182 having a receiving end 184 that is coupled to the fuel-cell system 19 and a tailpipe 186 configured to vent the contents to the outside environment. For example, the fuel-cell system 19 may include a cathode exhaust line 158 connected to the receiving end 184 and a drain line 138 that is also connected to the receiving end 184. The drain line 183 may extend from the purge valve 139 at a slope to facilitate draining of water. In order to facilitate draining of the exhaust system 160, the exhaust pipe 182 may also be sloped downwardly at an angle so that water will gravity flow out of the tailpipe 186 when the vehicle is on relatively flat ground. (The drain lines 138 and 158 may be similarly sloped in some embodiments, but this is not required.) For example, the exhaust system 180 and/or the drain lines 138 or 158 may have a 3 percent slope towards the tailpipe 186 such that the exhaust system 160 will gravity drain as long as the vehicle pitch is less than −3 degrees. Three percent is just an example for discussion purposes and the slope of the exhaust pipe/drain lines may be more or less in other embodiments.

FIG. 5A shows the vehicle on flat ground. Here, the built-in pitch or slope of the exhaust system 160 allows the system to gravity drain. Therefore, any accumulated water within the exhaust pipe 182, for example, is able to drain out of the system through the tailpipe 186.

Figure 5B:
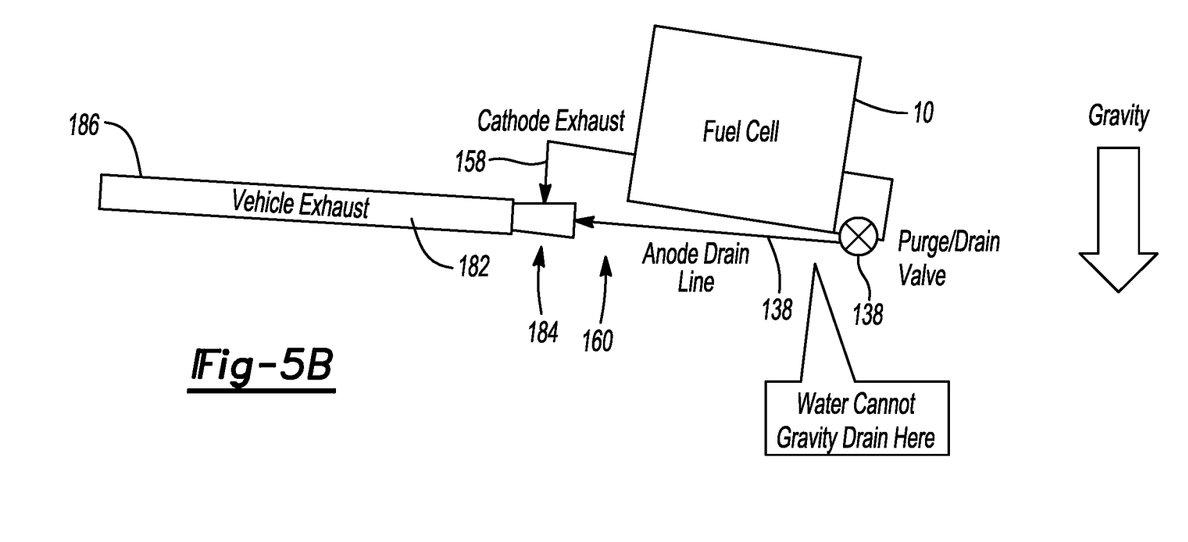
FIG. 5B illustrates the vehicle on a steep grade in which purged contents of the fuel-cell system cannot gravity feed through the vehicle exhaust.

FIG. 5B shows a different scenario in which the vehicle 10 is on a downhill grade in excess of −3 percent, for example. Here, the slope of the exhaust pipe 182 and/or the drain lines has reversed due to the road grade resulting in a flow reversal. That is, any water left in the vehicle exhaust will flow backwards towards the fuel-cell 112 rather than out the tailpipe 186. This scenario may present issues with regard to purging water from the vehicle.

The anode side and/or the cathode side of the fuel-cell 112 may be periodically purged to remove excess water, nitrogen, or other unwanted elements within the system 19. One example purge routine is removing water from the separator 136. As explained above, the separator 136 removes water from the anode. This separated water collects in a collection chamber or reservoir and is periodically purged to the exhaust system 160. The purge routine includes controlling the purge valve 139 and the ejector 124 to blow the water out of the drain line 138 using hydrogen as a propellant. To reduce hydrogen fuel consumption, the purge routine is limited in duration and frequency. Given the designed slope of the vehicle exhaust system 182, it is normally only necessary to advance the water from the drain line 138 and to the exhaust pipe 182, where gravity takes over. However, as explained above, this is not the case when the vehicle is parked on a sufficiently steep downhill grade as the exhaust system now has a reverse pitch and thus the water must completely clear the drain line in order to prevent flow back to the purge valve or other upstream component. This reverse-slope condition requires additional hydrogen in order to fully clear the system. In order to tailor the purge routine for these different scenarios, the controller 21 may be programmed with multiple purge routines that are selected based on measured vehicle pitch. For example, a baseline purge routine is used when the vehicle is on relatively flat or uphill grade and an enhanced purge routine is used when the vehicle is on downhill grade. The enhanced purge routine is designed to clear the water through the drain line so that there is minimal or no residual water left in the conduit to flow back into the upstream component, such as the purge valve.

The vehicle 10 may also have one or more freeze preparation routines controlled by the controller 21. The freeze preparation routines are similar to the purge routines and that hydrogen gas is used as a propellant to flush the system of any residual water when the ambient air temperature poses a freezing risk. Like the purge routines, the controller may be programmed with a baseline freeze preparation routine that is used when the vehicle pitch is below threshold and in enhanced freeze preparation that is used when the vehicle pitch exceeds a threshold.

Control logic or functions performed by controller 21 may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle, engine, and/or powertrain controller, such as controller 21. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

Figure 6:
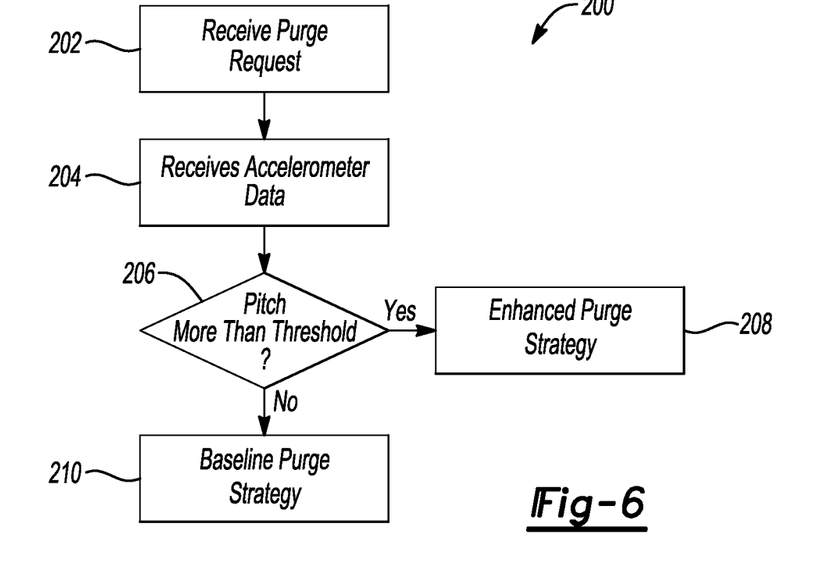
FIG. 6 is a flow chart of an algorithm for controlling purge of the fuel cell.

FIG. 6 is a flowchart 200 of an algorithm for controlling purge based on vehicle pitch. Control begins at operation 202 with a purge request being received. At operation 204 the controller receives data from the accelerometer indicative of a pitch of the vehicle. The controller receives this data and determines the vehicle pitch. The vehicle pitch is then compared to a threshold at operation 206. For example, the vehicle pitch may be expressed as a pitch angle and the threshold may be an angle. Alternatively, the pitch and thresholds may be expressed as percentages. The value of the threshold may be based on the slopes of the exhaust system. For example, the threshold corresponds to a change in sign of a slope of the purge valve. That is, the drain line and/or the exhaust pipe slopes such that fluid flows away from the purge valve (or out of the tailpipe) when the pitch is within the threshold, and the drain line and/or the exhaust pipe slopes such that the fluid flows towards the purge valve (or away from the tailpipe) when the pitch is outside of the threshold.

In one embodiment, the threshold may be positive 15 degrees, of course this is just one example. Here, if the pitch of the vehicle exceeds positive 15 degrees (or is outside of absolute value control passes to operation 208 and the enhanced purge strategy is commanded. Conversely, if the pitch is less than or within the threshold, the normal baseline purge strategy is commanded at operation 210.

The enhanced purge strategy may have a longer duration than the baseline strategy. Alternatively or additionally, the enhanced purge strategy may include a larger opening of the purge valve and/or a larger duty cycle of the ejector to increase hydrogen pressure within the system as compared to the baseline strategy. In some embodiments, the duration of the enhanced purge strategy may be variable and based on the measured pitch of the vehicle. Here, the duration increases as the vehicle pitch increases and the duration decreases as the vehicle pitch decreases. In some embodiments, the controls may utilize absolute values of pitch rather than relying on the above-described sign convention to determine if the vehicle is facing uphill or downhill.

Figure 7:
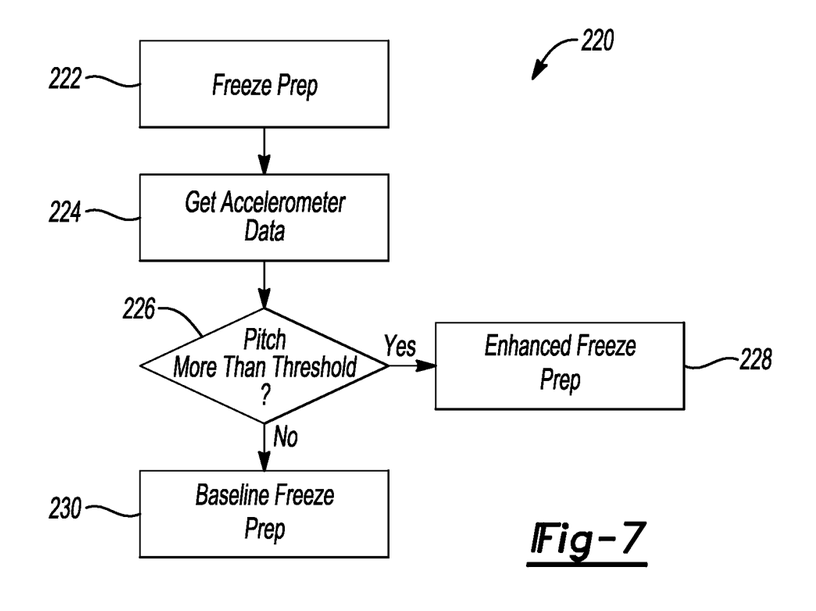
FIG. 7 is a flow chart of an algorithm for controlling freeze preparation of the fuel cell.

FIG. 7 illustrates controls 220 for freeze preparation. Control begins at operation 202 with a request for freeze preparation. At operation 224, the controller receives data from an accelerometer or acceleration sensor. In operation 226, the controller compares the measured pitch to threshold similar to operation 206. If the pitch is outside of or exceeds the threshold control passes to operation 228 where an enhanced freeze preparation routine is commanded. Conversely, the baseline freeze preparation routine is commanded operation 230 if the pitch is less than or within the threshold at operation 226. The differences between the enhanced strategy and the baseline strategy may be the same as those employed for the purge strategy and that disclosure is incorporated herein for brevity.

By providing multiple different purge and freeze preparation routines based on vehicle pitch, the vehicle can conserve hydrogen fuel while also providing sufficient purging of the water to account for variations in road grade.

In the above examples, the drain lines and exhaust system sloped downwardly towards the rear of the vehicle. Thus, pitch was the important factor in determining whether or not the water would gravity flow in the desired direction. In other embodiments, the tailpipe may exit to a lateral side of the vehicle. Here, the important factor may be the roll of the vehicle. If this is the case, the above-described controls may be modified to measure vehicle role with the accelerometer and to determine which purge routine to use based on the roll. For example, the controller may command a normal purge routine responsive to the vehicle roll being less than or within a threshold and may command an enhanced purge routine responsive to the vehicle roll being greater than or outside a threshold. Here, the above-described controls may be used, albeit with roll substituted for pitch. In other vehicles, both pitch and roll may be relevant factors to the sloping of the drain lines an exhaust system. In that case, the accelerometer may be configured to measure vehicle pension vehicle roll and compare these two one or more thresholds to determine when to use the baseline purge routine or the enhanced routine. These changes may also be made to the freeze preparation controls to account for the different slopes and placements of the drain lines an exhaust system.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to strength, durability, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle comprising:
a fuel-cell system including a fuel cell, a hydrogen supply, a purge valve, and a drain line extending from the purge valve, wherein the drain line slopes such that fluid gravity flows away from the purge valve when the pitch is within the threshold, and the drain line slopes such that the fluid gravity flows towards the purge valve when the pitch is outside of the threshold; and
a controller programmed to:
responsive to a pitch of the vehicle being within a threshold, control the hydrogen supply and the purge valve according to a baseline purge routine, and
responsive to the pitch of the vehicle being outside of the threshold, control the hydrogen supply and the purge valve according to an enhanced purge routine.

2. The vehicle of claim 1 further comprising an accelerometer, wherein the pitch is based on data from the accelerometer.

3. The vehicle of claim 1, wherein the threshold corresponds to a change in sign of a slope of the drain line.

4. The vehicle of claim 1, wherein a duration of the enhanced purge routine is longer than a duration of the baseline purge routine.

5. The vehicle of claim 4, wherein the duration of the enhanced purge routine is based on the pitch.

6. The vehicle of claim 5, wherein the duration of the enhanced purge increases as an absolute value of the pitch increases and decreases as the absolute value of the pitch decreases.

7. The vehicle of claim 1, wherein the purge valve is commanded open longer in the enhanced purge routine compared to the baseline purge routine.

8. The vehicle of claim 1, wherein the controller is further programmed to:
responsive to a request for freeze preparation and the pitch of the vehicle being within the threshold, control the hydrogen supply and the purge valve according to a baseline freeze-preparation routine, and
responsive to the request for freeze preparation and the pitch of the vehicle being outside of the threshold, control the hydrogen supply and the purge valve according to an enhanced freeze-preparation routine.

9. The vehicle of claim 8, wherein the purge valve is commanded open longer in the enhanced freeze-preparation routine compared to the baseline freeze-preparation routine.

10. A vehicle comprising:
a fuel-cell system including a fuel cell, a hydrogen source, a hydrogen ejector, and a purge valve; and
a controller programmed to:
responsive to a purge request and a pitch of the vehicle being less than a threshold, (i) open the hydrogen ejector and (ii) open the purge valve for a first duration of time,
responsive to the purge request and the pitch of the vehicle exceeding the threshold, (i) open the hydrogen ejector and (ii) open the purge valve for a second duration of time that is longer than the first duration of time,
responsive to a request for freeze preparation and the pitch of the vehicle being less than the threshold, (i) open the hydrogen ejector and (ii) open the purge valve for a third duration of time, and
responsive to a request for the freeze preparation and the pitch of the vehicle exceeding the threshold, (i) open the hydrogen ejector and (ii) open the purge valve for a fourth duration of time that is greater than the third duration of time.

11. The vehicle of claim 10 further comprising an accelerometer, wherein the pitch is based on data from the accelerometer.

12. The vehicle of claim 10 further comprising a drain line connected in fluid communication with the purge valve, wherein the threshold corresponds to a change in sign of a slope of the drain line.

13. The vehicle of claim 10, wherein the second duration of time is based on the pitch.

14. A vehicle comprising:
- a fuel-cell system including a fuel cell, a purge valve, and a drain line extending from the purge valve; and
- a controller is programmed to:
  - open the purge valve according to a baseline freeze-preparation routine when the drain line slopes away from the purge valve, and
  - open the purge valve according to an enhanced freeze-preparation routine when the drain line slopes towards the purge valve.

15. The vehicle of claim 14, wherein a duration of the baseline purge routine is shorter than a duration of the enhanced purge routine.

16. The vehicle of claim 14 further comprising an accelerometer, wherein the controller is further programmed to determine a slope of the drain line based on a data received from the accelerometer.

17. The vehicle of claim 14, wherein the controller is further programmed to:
- open the purge valve according to a baseline purge routine when the drain line slopes away from the purge valve, and
- open the purge valve according to an enhanced purge routine when the drain line slopes towards the purge valve.

* * * * *